(Model.)
Z. C. PHEATT.
METALLIC GRAPE VINE TIE.
No. 362,656. Patented May 10, 1887.
 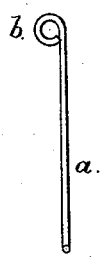 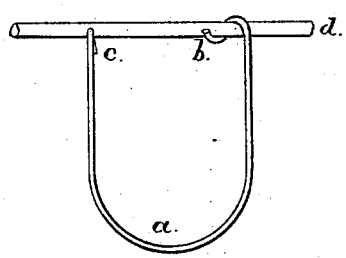
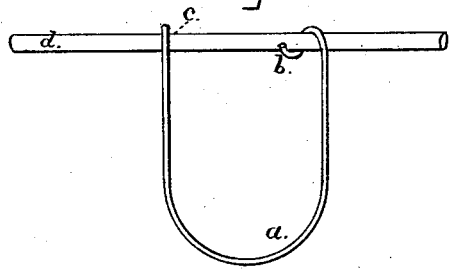
Witnesses:
H. H. Brown.
Wesley Royce.
Inventor:
Zebulon C. Pheatt
By Almon Hall
His atty.

UNITED STATES PATENT OFFICE.

ZEBULON C. PHEATT, OF TOLEDO, OHIO.

METALLIC GRAPE-VINE TIE.

SPECIFICATION forming part of Letters Patent No. 362,656, dated May 10, 1887.

Application filed September 4, 1886. Serial No. 212,663. (Model.)

*To all whom it may concern:*

Be it known that I, ZEBULON C. PHEATT, a citizen of the United States, residing at Toledo, Lucas county, Ohio, have invented a new and useful Metallic Grape-Vine Tie, the object of which is to provide a convenient, cheap, and durable device for attaching grape-vines to wire trellises.

My device is illustrated in the accompanying drawings, made part hereof, in which—

Figure 1 is a view of my tie disengaged from the trellis-wire; Fig. 2, a side view of one half the tie, showing hook $c$; Fig. 3, a side view of the other half of the tie, showing spiral $b$; Fig. 4, a view showing tie partly attached to a trellis-wire, and Fig. 5 a view showing the tie in its final position on the trellis-wire.

My tie is made, preferably, of spring brass wire. The wire is cut in suitable lengths and bent in U-shaped loops $a$ of such size as to receive all vines to be supported. One end of loop $a$ is bent or curled inwardly, so as to form a short spiral, as shown at $b$, the other end of the loop $a$ being bent so as to form a hook, as shown at $c$. The loop $a$ being placed around the cane or branch of the vine to be supported, spiral $b$ is hooked over the horizontal trellis-wire $d$, as shown in Fig. 4. The loop $a$ is now pressed so that hook $c$ may be sprung over wire $d$, as shown in Fig. 5, the vine being supported in the yoke formed by the loop $a$ and trellis-wire $d$.

It will be observed that the tie will yield somewhat to the swaying of the vines without becoming detached from the trellis-wire, the hook $c$ being prevented from slipping off the wire $d$ by the loop $a$ and spiral $b$, which act as a spring, pressing hook $c$ to its proper position. The tie may be readily attached and detached at pleasure, thus facilitating and cheapening the operation of trimming and pruning vines.

I am aware that metallic ties or loops clamped permanently on horizontal trellis-wires for the support of vines are old; but I am not aware that such ties or loops have heretofore been arranged as springs designed to hold the same in place, and so as to permit their easy removal and replacement without undue bending or injury.

What I claim as my invention, and desire to secure by Letters Patent, is—

1. A grape-vine tie consisting of a wire loop, one end of which terminates in a spiral and the other end thereof in a hook, substantially as shown and described, for the purpose specified.

2. As a means of supporting vines, a spring consisting of a wire loop having at one end a hook and at its other end a spiral, in combination with a trellis-wire, substantially as shown and described, for the purpose specified.

ZEBULON C. PHEATT.

Witnesses:
ALEXANDER L. SMITH,
H. W. BROWN.